Figure 1:
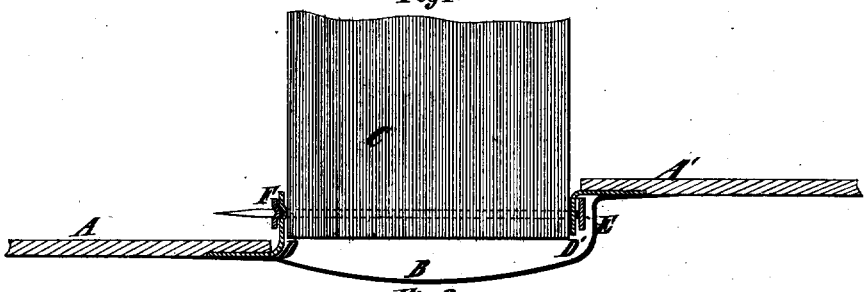

N. S. OTIS.

Assignor to W. S. & H. M. GRAY, Trustee.

Temporary Binder.

No. 8,419. Reissued Sept. 17, 1878.

*Witnesses:*
Thomas E. Birch.
Owen Prentiss.

*Inventor:*
Newton S. Otis
by his Attorney
Edwin H. Brown

THE NORRIS PETERS CO., PHOTO-LITHO., WASHINGTON, D. C.

UNITED STATES PATENT OFFICE.

NEWTON S. OTIS, OF NEW YORK, N. Y., ASSIGNOR, BY MESNE ASSIGNMENTS, TO WILLIAM S. GRAY, AND H. MOTT GRAY, TRUSTEE.

IMPROVEMENT IN TEMPORARY BINDERS.

Specification forming part of Letters Patent No. 176,123, dated April 11, 1876; Reissue No. 8,419, dated September 17, 1878; application filed February 26, 1878.

*To all whom it may concern:*

Be it known that I, NEWTON S. OTIS, of the city, county, and State of New York, have invented certain new and useful Improvements in Temporary Files and Binders, of which the following is a specification:

My invention relates to the class of devices designed to file, bind, and preserve in a permanent and compact form letters, circulars, sheets of legal and other documents, and all papers of that nature that it is desirable to preserve, either in the order of their reception or otherwise.

The present invention consists in a series of improvements on the old and well-known French file and binder; also, in certain improvements on the file and binder for which Letters Patent No. 168,179 were granted to me September 28, 1875.

In the practical use of the old French file and binder many serious defects have been found in the method of binding the papers in the permanent binding-covers. The same defects are also found in the other forms of files and binders of the same class. These defects have in a great measure been corrected by the adoption of certain devices for which I have already applied for Letters Patent. The permanent metal binding strips and their attendant needles fastened on the exterior of the permanent binding-covers have proved very objectionable, because they are clumsy in appearance, permit the books to catch in the cases, and scratch the covers of adjacent books so as to destroy them in time. Other objections exist which are plainly apparent without being mentioned in detail.

My present improvements obviate all such difficulties, as I place binding strips or wings inside of the permanent binding-covers, thus leaving their exteriors free from any projections of any nature, and giving the permanently-bound papers the neat appearance that a first-class bound book possesses. Moreover, they provide for very conveniently securing letters, circulars, documents, and papers together.

My improved method of binding may be applied to the various forms of permanent binders, using their forms of binding devices for full books, but making the attachments, flexibly-connected binding strips or wings, a part of the interior of the covers, instead of applying them on the exterior, as is now the case; but the invention is particularly adapted to the mode of binding described and shown in the said Letters Patent No. 168,179, by means of which I am enabled to permanently and conveniently bind papers at any point of time during the temporary filing, and without regard to the quantity of papers in the file.

The binding or filing machine method of attaching the permanent binding-covers therein, the process of filing papers, and their removal from the binding-machine may be substantially the same as shown and described in the patent previously referred to. As stated therein, and in the present case, I make use of the sharp-pointed flexible binding-needles attached to a metal binding-bar, and a channeled binding-bar bending the projecting points of the needles down into such channel, when the process of binding is completed.

Figure 2:
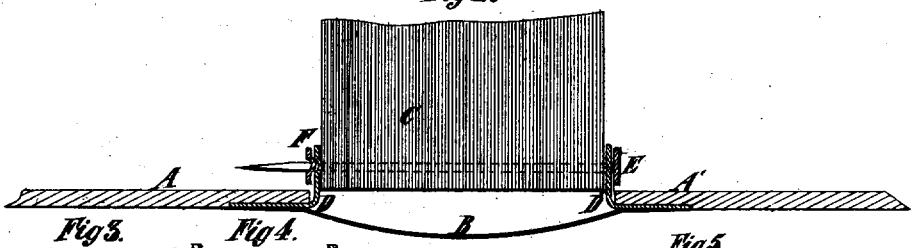
Figure 3:
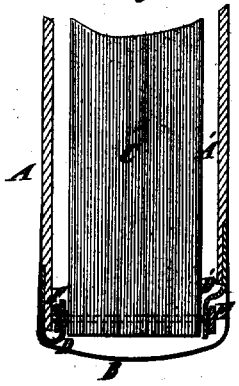
Figure 4:
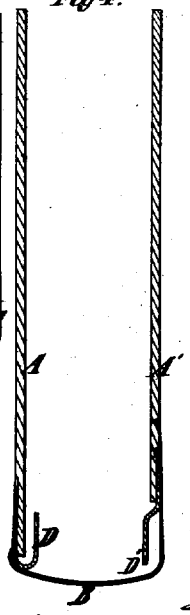
Figure 5:
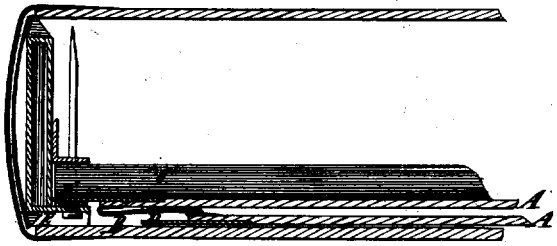
Figure 6:
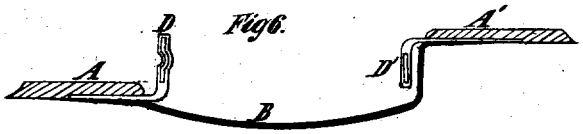
Figure 7:
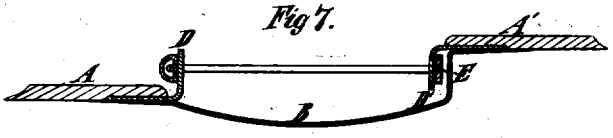

In the accompanying drawings, Figure 1 is a transverse section of a binder embodying my invention and having its covers open. Fig. 2 is a similar view of such a binder slightly modified in form. Fig. 3 is a similar view of the binder shown in Fig. 1 with its covers closed. Fig. 4 is a similar view of the binder empty and exhibiting the different widths of its covers. Fig. 5 is a transverse section of a binding or filing machine, showing the method of holding the binder therein during the filing of papers. Fig. 6 is a transverse section of a binder of modified form, and Fig. 7 is a transverse section of a binder embodying the old perforated needles and binding-strips.

A A′ represent the covers of the permanent binder. B is the flexible leather or cloth back of the same, of the usual construction and application. C represents the papers when bound into the covers. D and D′ are two leather or cloth strips or wings bound into the covers at the point of their connection with the flexible back B. These leather or cloth strips or wings project sufficiently to enable needles passing through them to pierce letters or papers to be bound at a proper distance from their edges. The said needles may be combined with metal bars, to one of which they are affixed, and both of which are independent of the strips or wings, and are applied thereto, as shown in Figs. 1, 3, 4, and 5, or as shown in the other figures. E is a binding-bar, to which the binding-needles are attached, and it is placed on one side of the leather or cloth strip or wing D′, the needles being passed through the same, thence through the papers to be bound, and through the leather or cloth strip or wing D on the opposite side. The channeled binding-bar F is then applied on the outside of the leather or cloth strip or wing D, the needles are passed through openings provided therefor, and are then bent down into the channel in said bar, completing the process of binding. This done the covers may be closed, and the book will present the appearance shown in Fig. 3, all of the binding attachments and apparatus being on the inside of the covers and concealed from the sight.

In Figs. 1, 3, and 5 the binding-bar E is shown as placed against the inner side of the strip or wing D′, and the cover A′, from which said strip or wing extends, is made narrower than the cover A to the extent of about the width of said strip or wing, so that it and the strip or wing E, when bent backward, will together equal the width of the cover A. In this way I am enabled to use the binder in the usual binding-machine, and conceal the binding-bar E from view without unfavorably changing the external appearance of the binder.

In Fig. 2 the binding-bar E is shown as placed against the outer side of the strip or wing D′, and in this way it may be used for binding without the binding-machine, and both covers may be the same size.

The use of the perforated needles and binding strip, as applied in the French file and binder, or the needles with slotted heads of the Bennett file and binder, patented September 15, 1874, is permitted in connection with the projecting binding strips or wings D and D′, as shown in Fig. 7.

The channeled binding-bar may be bound into the interior of the leather or cloth strip or wing D, as seen in Fig. 6, and, generally speaking, this method is preferred, as each set of extra permanent covers is complete in itself, as it obviates the necessity of having loose binding-bars, which are liable to be lost.

The binding leather or cloth strip or wing D′ may also be stiffened by means of a thin bar of sheet metal bound therein, if so desired.

My improved method of binding may be applied to magazines, newspapers, periodicals, or other books of that nature. Single sheets of paper, like way or freight bills, used in railroad and steamboat offices, may also be filed and bound without going through the usual binding-machine. In this case the binding-bar E, armed with the needles, might be bound in or fastened to one of the projecting strips or wings, or rigidly attached to one cover, so as to maintain the needles in an upright position. The papers, perforated at one edge so as to coincide with the needles, are slipped over the pointed needles, filed, and bound up by bringing the opposite strip or wing, provided with a channeled or other binding-bar, over the needles, and the binding completed, as hereinbefore described.

What I claim as my invention, and desire to secure by Letters Patent, is—

1. A binder provided with strips or wings extending from near the back edges of the covers, and having one cover narrower than the other to the extent of about the width of a needle binding-bar to be used in such binder, substantially as specified.

2. In a binder, the combination, with flexibly-connected strips or wings, of a bar provided with a series of needles extending from one strip or wing, adapted to pass through and remain in papers, pamphlets, &c., so as to secure them in the binder, and to be fastened to the other strip or wing of the binder, substantially as specified.

3. In a binder, the combination, with strips or wings, of a bar adapted to fit against one of the strips or wings, and furnished with a series of needles adapted to be bent for the purpose of securing them to the other strip or wing, substantially as specified.

4. In a binder, the combination, with strips or wings and a bar adapted to fit against one of the strips or wings, and furnished with a series of needles adapted to be bent, of a channeled binding-bar attached to the other strip or wing and adapted to receive the ends of the needles when bent, substantially as specified.

5. In a binder, the strips or wings D D′, projecting from the base inside the covers A A′, and operating as a binding device, in combination with a bar armed with a series of needles or wires tapering to a point, or provided with openings near their points, and an auxiliary binding-bar, constructed and operating substantially as and for the purpose as herein shown and set forth.

In testimony whereof I have hereunto set my hand in the presence of the subscribing witnesses.

NEWTON S. OTIS.

Witnesses:
F. S. HASBROUCK,
GEO. W. HEAD.